(12) United States Patent
Zheng

(10) Patent No.: US 7,446,823 B2
(45) Date of Patent: Nov. 4, 2008

(54) FOLDABLE MOBILE VIDEO DEVICE

(76) Inventor: Edward Zheng, 1661 Fairplex Dr., La Verne, CA (US) 91750

(*) Notice: Subject to any disclaimer, the term of this patent is extended or adjusted under 35 U.S.C. 154(b) by 568 days.

(21) Appl. No.: 10/937,464

(22) Filed: Sep. 8, 2004

(65) Prior Publication Data
US 2006/0050473 A1  Mar. 9, 2006

(51) Int. Cl.
  *H04N 5/64* (2006.01)
  *H05K 5/00* (2006.01)
  *G06F 1/16* (2006.01)
  *A47C 7/62* (2006.01)

(52) U.S. Cl. .............. 348/837; 348/838; 297/188.04; 297/188.2; 361/681

(58) Field of Classification Search ......... 348/836–839, 348/739, 522, 553, 554; 345/156; 248/918, 248/919, 922, 923; 297/188.04–188.06, 297/188.2; 361/681; D14/315
See application file for complete search history.

(56) References Cited

U.S. PATENT DOCUMENTS

| | | | | |
|---|---|---|---|---|
| 5,375,076 A | * | 12/1994 | Goodrich et al. | 361/681 |
| 6,006,243 A | * | 12/1999 | Karidis | 708/100 |
| 6,266,236 B1 | * | 7/2001 | Ku et al. | 361/681 |
| 6,275,376 B1 | * | 8/2001 | Moon | 361/683 |
| 6,353,529 B1 | * | 3/2002 | Cies | 361/681 |
| 6,492,974 B1 | * | 12/2002 | Nobuchi et al. | 345/156 |
| 6,504,707 B2 | * | 1/2003 | Agata et al. | 361/681 |
| 6,532,147 B1 | * | 3/2003 | Christ, Jr. | 361/683 |
| 6,542,721 B2 | * | 4/2003 | Boesen | 455/553.1 |
| 6,746,065 B1 | * | 6/2004 | Chan | 296/24.34 |
| 6,903,927 B2 | * | 6/2005 | Anlauff | 361/681 |
| 6,937,280 B2 | * | 8/2005 | Kawai et al. | 348/333.06 |
| D528,541 S | * | 9/2006 | Maskatia | D14/315 |
| 2004/0228622 A1 | * | 11/2004 | Schedivy | 386/125 |

* cited by examiner

*Primary Examiner*—Victor R Kostak
(74) *Attorney, Agent, or Firm*—Raymond Y. Chan; David and Raymond Patent Firm

(57) ABSTRACT

A foldable mobile video device includes a base panel, a display panel, and a multimedia unit. The base panel has a rear supporting side, a front utility side, and a multimedia compartment indently formed on the front utility side. The display panel has an outer displaying side and inner enclosing side, wherein the display panel is pivotally connected to the base panel edge-to-edge to pivotally fold the display panel between a folded position and an unfolded position. The multimedia unit includes a display screen provided on the outer displaying side of the display panel, and a media reader operatively mounted at the multimedia compartment for reading digital data of a multimedia disposed in the multimedia compartment so as to display the digital data of the multimedia on the display screen, with a selectively adjustable eye-to-screen distance.

16 Claims, 9 Drawing Sheets

FOLDABLE MOBILE VIDEO DEVICE

BACKGROUND OF THE PRESENT INVENTION

1. Field of Invention

The present invention relates to a video device, and more particularly to a foldable mobile video device which has a minimum space occupation while operating to play a predetermined multimedia, such as a DVD disc.

2. Description of Related Arts

Referring to FIG. 1 of the drawings, a conventional portable multimedia player, such as a conventional DVD player, generally comprises a supporting base 10P having a multimedia compartment formed on top thereon, a display panel 20P pivotally mounted on the supporting base 10P in an edge-to-edge manner, and a multimedia device 30P which comprises a display screen 31P mounted on a bottom displaying side of the display panel 20P, and a multimedia reader 32P operatively provided in the multimedia compartment for reading information stored in an external multimedia, such as a DVD.

The display panel 20P is generally adapted to move between an operation position and a folded position, wherein at the folded position, the display panel 20P is pivotally moved to overlappedly folded towards the supporting base 10P to form a compact structure such that the display screen 31P is securely protected between the supporting base 10P and the display panel 20P. On the other hand, when the display panel 20P is in the operation position, it is pivotally unfolded from the supporting base 10P at an inclination which is usually greater than ninety degrees wherein a user is able to view multimedia materials which is retrieved from the multimedia reader 32P from the display screen 31P, as shown in FIG. 1 of the drawings.

Such a conventional multimedia player, although popular, nonetheless has several inherent problems. First of all, it seems that the very reason for mounting the display screen 31P on the bottom displaying side of the display panel 20P is that when it is in the folded position, the display screen 31P can be substantially protected from external environment. At first sight, this seems to be a clever engineering consideration, but this consideration is regrettably where the problem lies. The fact that the display screen 31P needs some sorts of protection does not necessarily mean that it has to be constructed as such. There could have some sorts of protective covers which could have been mounted on the display panel 20P for protecting the display screen 31P.

If one accepts the above reasoning, it is then rather easy to identify the unjustifiable nature of the folding arrangement of the conventional DVD player. The major problem is that if the display screen 31P is mounted on the bottom displaying side of the display panel 20P, when one is viewing the display screen 31P, the angle of inclination between the supporting base 10P and the display panel 20P must be at least ninety degrees. In most of the case, for a comfortable viewing of the multimedia materials, the angle of inclination is something between 120 degrees and 150 degrees, depending on the user's body size. This practical 'requirement' inevitably increases the overall occupation space of the entire multimedia player, especially its depth L1, and that it is indeed very difficult to reduce the size or spatial occupation in such an operation arrangement. As a result, this conventional multimedia player may not be used in a confined environment, especially when a depth of the table on which the multimedia player rests is not adequate. Unfortunately however, this scenario occurs very frequently in most outdoors environment where multimedia player is needed most, such as during a long flight or train ride, in which the user is typically confined in a very limited space and the only available supporting platform for the multimedia player is a small table in front of him.

SUMMARY OF THE PRESENT INVENTION

A main object of the present invention is to provide a foldable mobile video device which is adapted for folding to form a compact structure for convenience carrying or storage, and for unfolding to display multimedia materials while minimizing a space occupation, especially the depth, of the entire video device.

Another object of the present invention is to provide a foldable mobile video device comprising a display screen provided on an outer displaying side of a display panel such that when it is unfolded to operate, an inclination between the display panel and a base panel is less than 90 degrees so as to minimize space occupation, especially the occupying depth, of the entire video device.

Another object of the present invention is to provide a foldable mobile video device which has minimum space occupation so that it is adapted for mounting in a confined area such as on a car seat, or a ceiling of a car.

Another object of the present invention is to provide a foldable mobile video device which is capable of displaying multimedia materials whenever it is folded and unfolded. In other words, the present invention adapts to the maximum range of working environments.

Another object of the present invention is to provide a foldable mobile video device which does not involve complicated mounting or folding arrangements so as to minimize the manufacturing cost and the ultimate selling price of the present invention.

Accordingly, in order to accomplish the above objects, the present invention provides a foldable mobile video device, comprising:

a base panel having a rear supporting side, a front utility side, and a multimedia compartment indently formed on the front utility side;

a display panel having an outer displaying side and inner enclosing side, wherein the display panel is pivotally connected to the base panel edge-to-edge to pivotally fold the display panel between a folded position and an unfolded position, wherein at the folded position, the display panel is pivotally folded to overlap the enclosing side thereof on the utility side of the base panel to minimize a tilt angle between the base panel and the display panel, and at the unfolded position, the display panel is pivotally folded to selectively adjust the tilt angle between the base panel and the display panel; and a multimedia unit comprising a display screen provided on the outer displaying side of the display panel, and a media reader operatively mounted at the multimedia compartment for reading digital data of a multimedia disposed in the multimedia compartment so as to display the digital data of the multimedia on the display screen, wherein the display screen is allowed to selectively adjust an eye-to-screen distance when the display panel is pivotally folded at the tilt angle not more than ninety degrees so as to minimize a space occupation of the display panel with respect to the base panel.

These and other objectives, features, and advantages of the present invention will become apparent from the following detailed description, the accompanying drawings, and the appended claims.

DETAILED DESCRIPTION OF THE PREFERRED EMBODIMENT

Figure 1:
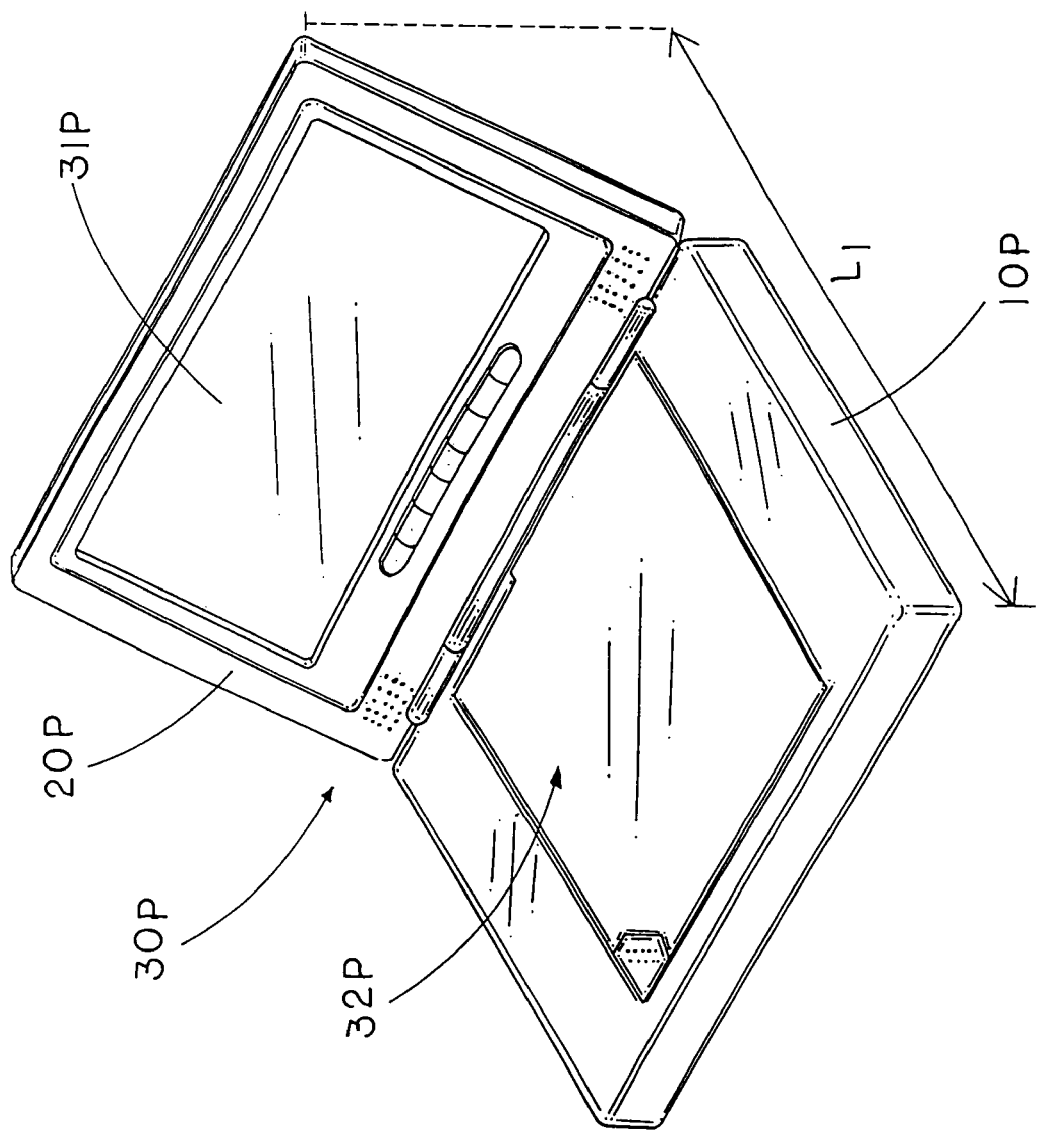
FIG. 1 is a conventional multimedia player.

Referring to FIG. 2 to FIG. 4, and FIG. 9 of the drawings, a foldable mobile video device according to a preferred embodiment of the present invention is illustrated, in which the video device comprises a base panel 10, a display panel 20, and a multimedia unit 30.

The base panel 10 has a rear supporting side 11, a front utility side 12, and a multimedia compartment 13 indently formed on the front utility side 12.

Figure 2:
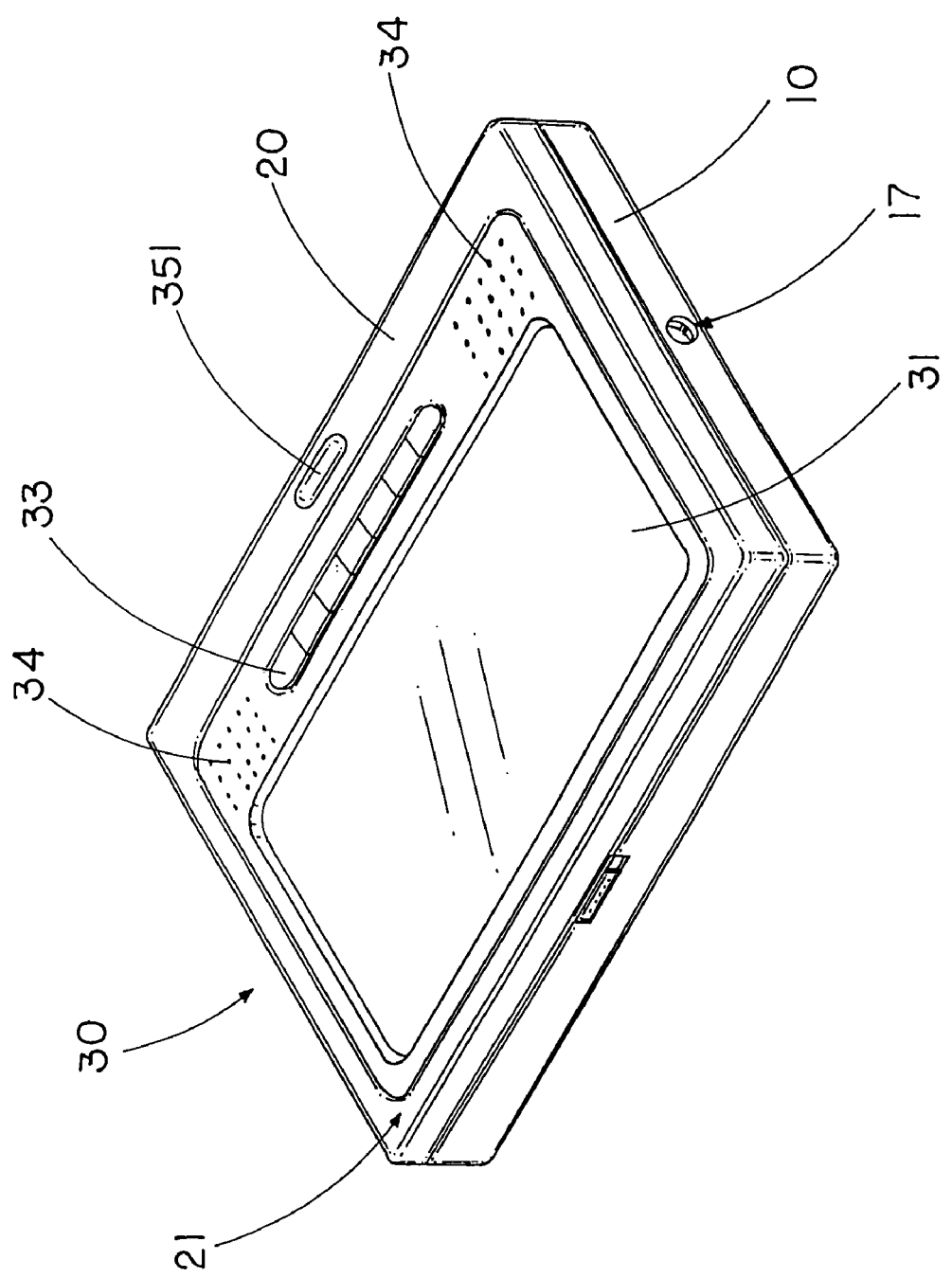
FIG. 2 is a perspective view of a foldable mobile video device according to a preferred embodiment of the present invention, illustrating that the video device is folded.

The display panel 20 has an outer displaying side 21 and inner enclosing side 22, in which the display panel 20 is pivotally connected to the base panel 10 edge-to-edge to pivotally fold the display panel 20 between a folded position and an unfolded position, wherein at the folded position, as in FIG. 2 of the drawings, the display panel 20 is pivotally folded to overlap the enclosing side 22 thereof on the utility side 12 of the base panel 10 to minimize a tilt angle α between the base panel 10 and the display panel 20. On the other hand, when the display panel 20 is at the unfolded position, the display panel 20 is pivotally unfolded to selectively adjust the tilt angle α between the base panel 10 and the display panel 20, as shown in FIG. 3 of the drawings.

The multimedia unit 30 comprises a display screen 31 provided on the outer displaying side 21 of the display panel 20, and a media reader 32 operatively mounted at the multimedia compartment 13 for reading digital data of a multimedia, such as a DVD, disposed in the multimedia compartment 13 so as to display the digital data of the multimedia on the display screen 31, wherein the display screen 31 is allowed to selectively adjust an eye-to-screen distance when the display panel 20 is pivotally folded at the tilt angle α not more than ninety degrees so as to minimize a space occupation of the display panel 20 with respect to the base panel 10.

Figure 4:
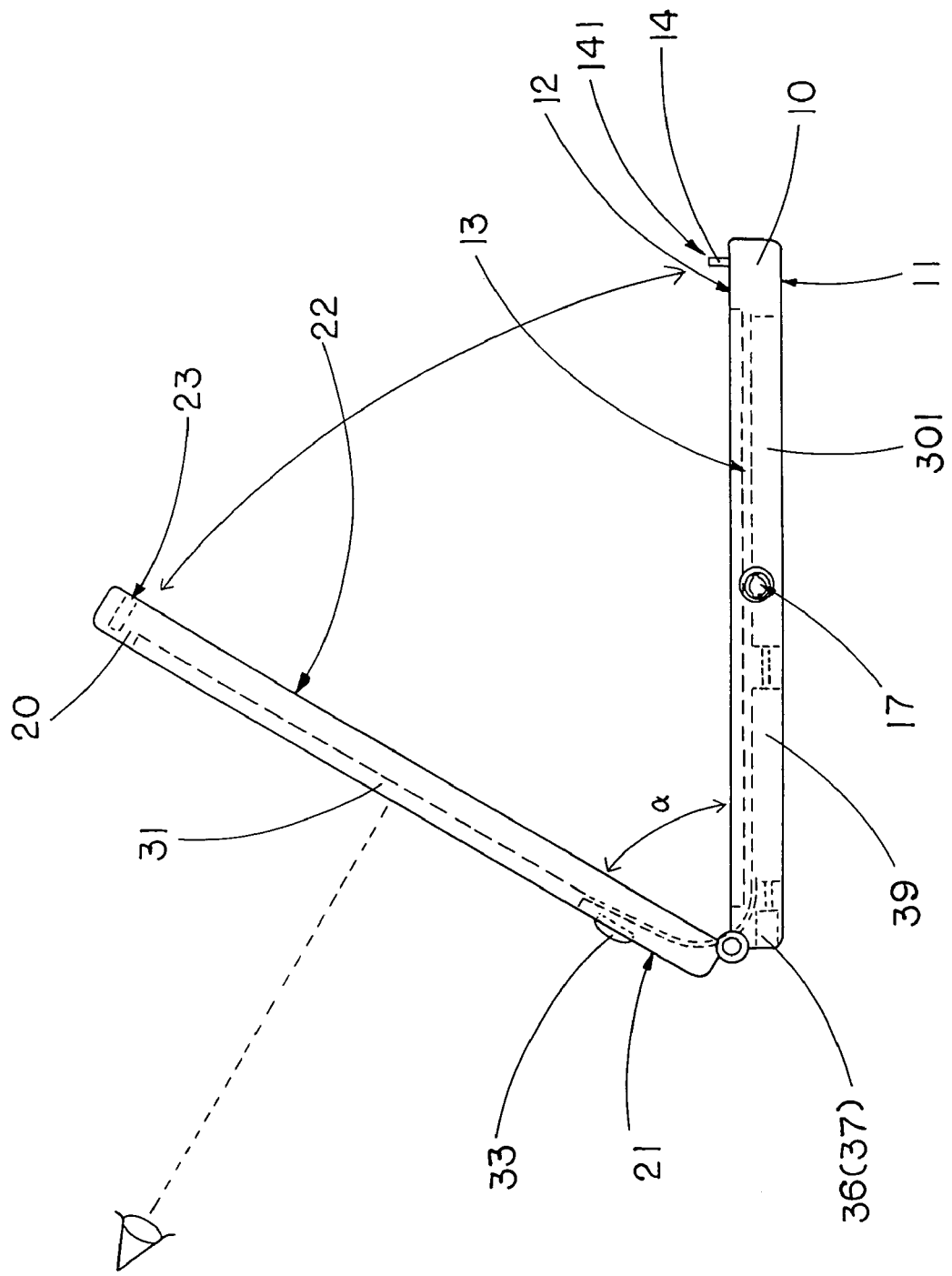
FIG. 4 is a side view of the foldable mobile video device according to the above preferred embodiment of the present invention.
Figure 9:
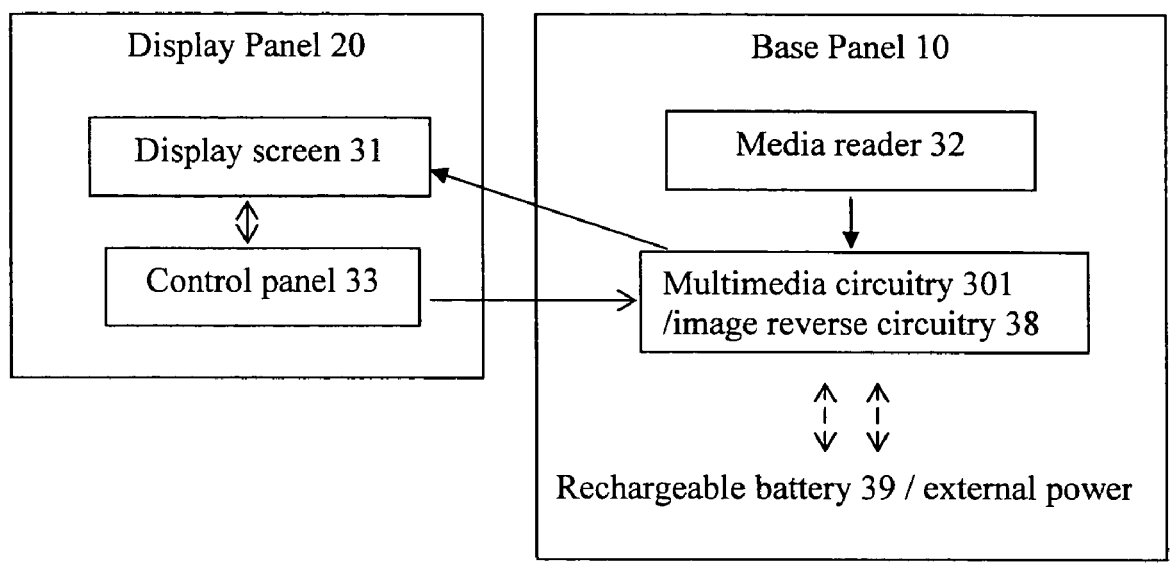
FIG. 9 is a schematic diagram of the foldable mobile video device according to the above preferred embodiment of the present invention.

As shown in FIG. 4 and FIG. 9 of the drawings, obviously, the multimedia unit 30 would further comprises a multimedia circuitry 301 supported within the base panel 10 and electrically connected with the display screen 31 and the media reader 32 in such a manner as to covert digital data stored in the multimedia and read by the media reader 32 to a graphical representation for displaying on the display screen 31.

Figure 3:
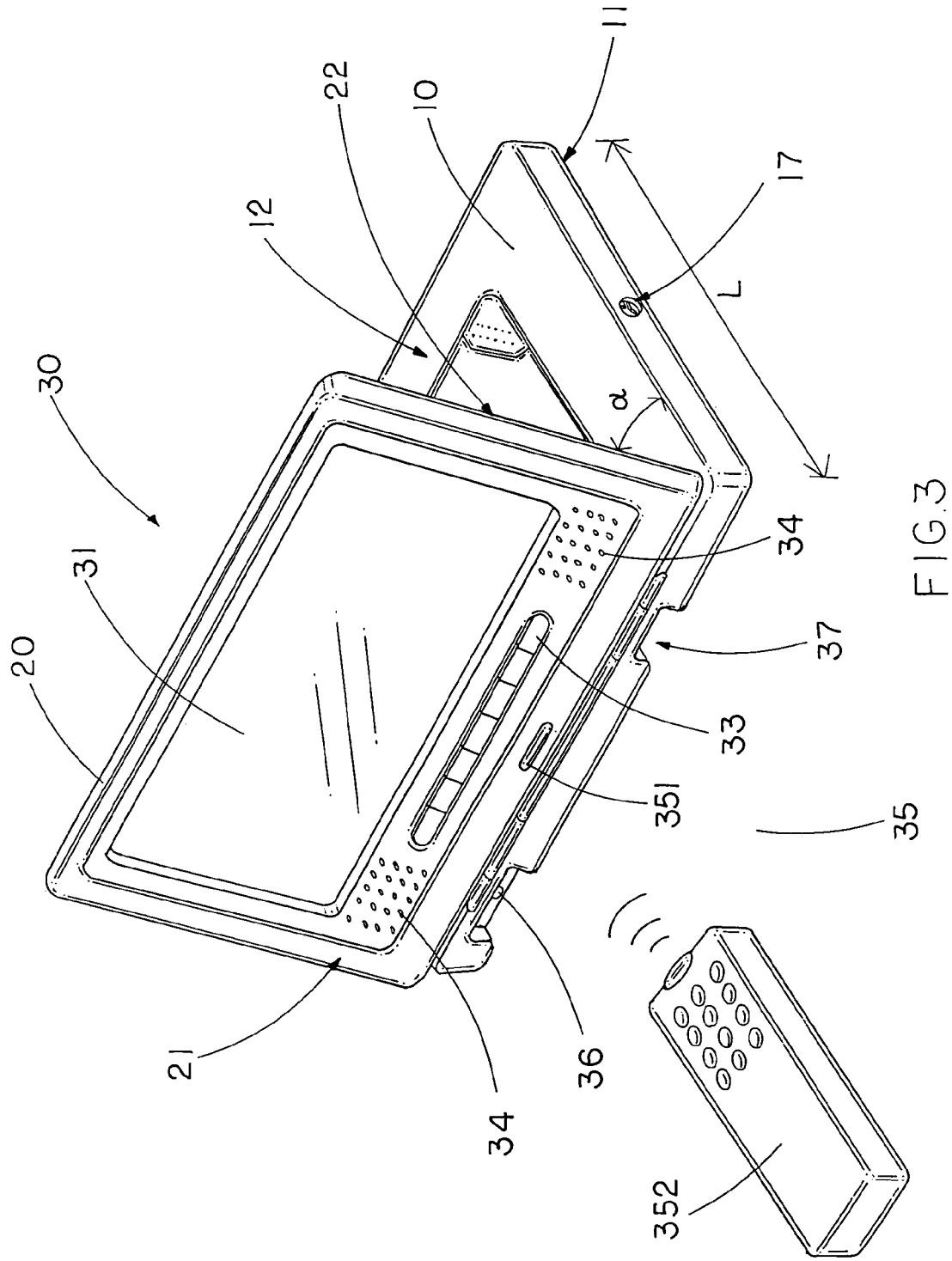
FIG. 3 is a perspective view of a foldable mobile video device according to the above preferred embodiment of the present invention, illustrating that the vide device is unfolded.

Referring to FIG. 3 to 4 of the drawings, when the display panel 20 is in the unfolded position, it is adapted to be unfolded at the tilt angle α of at most ninety degrees such that a depth of the video device is a depth of the base panel 10 wherein the display panel 20 is unfolded thereabove so as to minimize an overall depth L of the present invention. In other words, as long as a supporting table on which the vide device rests fits the base panel 20, unfolding of the display panel 20 does not increase the depth, which is not usually the case in conventional arts, of the video device so as to require additional depth of the supporting table except that for the base panel 20. Moreover, it should be stressed that a length of the base panel 10 is at least equal to a length of the display panel 20 so as to minimize a distance occupation (especially the depth) of the display panel 20 within the length of the base panel 10 when the display panel 20 is pivotally and upwardly unfolded at the tilt angle α.

As a matter of ordinary use of conventional DVD player, it is expected that the tilt angle α should be in a range of 60 degrees to 80 degrees to achieve an optimal eye-to-screen distance, and all is depending on the body's size of a user. In any event however, it should not be larger than ninety degrees for comfortable viewing.

As shown in FIG. 2 to 4 of the drawings, the multimedia unit 30 further comprises a control panel 33 provided on the display panel 20 underneath the display screen 31 at the outer displaying side 21 and electrically communicated with the media reader 32 for controlling an operation of the multimedia unit 30. Moreover, the multimedia unit 30 further comprises an audio unit provided on the outer displaying side 21 to operatively communicate with the media reader 32 for transmitting a sound signal of the digital data of said multimedia. The audio unit is preferably embodied as two loud speakers 34 provided at two side portions of the outer displaying side 21 and electrically communicated with the media reader 32 for producing the sound effect of the relevant multimedia in question.

It is worth stressing that by situating the control panel 33 and the loud speakers 34 at the outer displaying side, the user is able to conveniently control an operation of the multimedia unit 30, such as the volume of the loud speaker 34 or fast-forwarding, while viewing a particular movie on the display screen 31. Also, the display screen 31 is adapted for displaying the multimedia materials when the display panel 20 is pivotally folded to overlap the enclosing side 22 thereof on the utility side 12 of the base panel 10.

Furthermore, the multimedia unit 30 further comprises a remote control unit 35 comprising a remote sensor 351 provided at the outer displaying side 21 and electrically connected to the media reader 32, and a remote control 352 wirelessly communicating with the remote sensor 351 to remotely control the media reader 32 to operate. The remote control signal is preferably infrared radiation so as to be effectively transmitted in most short eye-to-screen distance environment. Thus, instead of directly controlling the control panel 33, one is able to control the operation of the multimedia unit 30 through the remote control unit 35.

Figure 5:
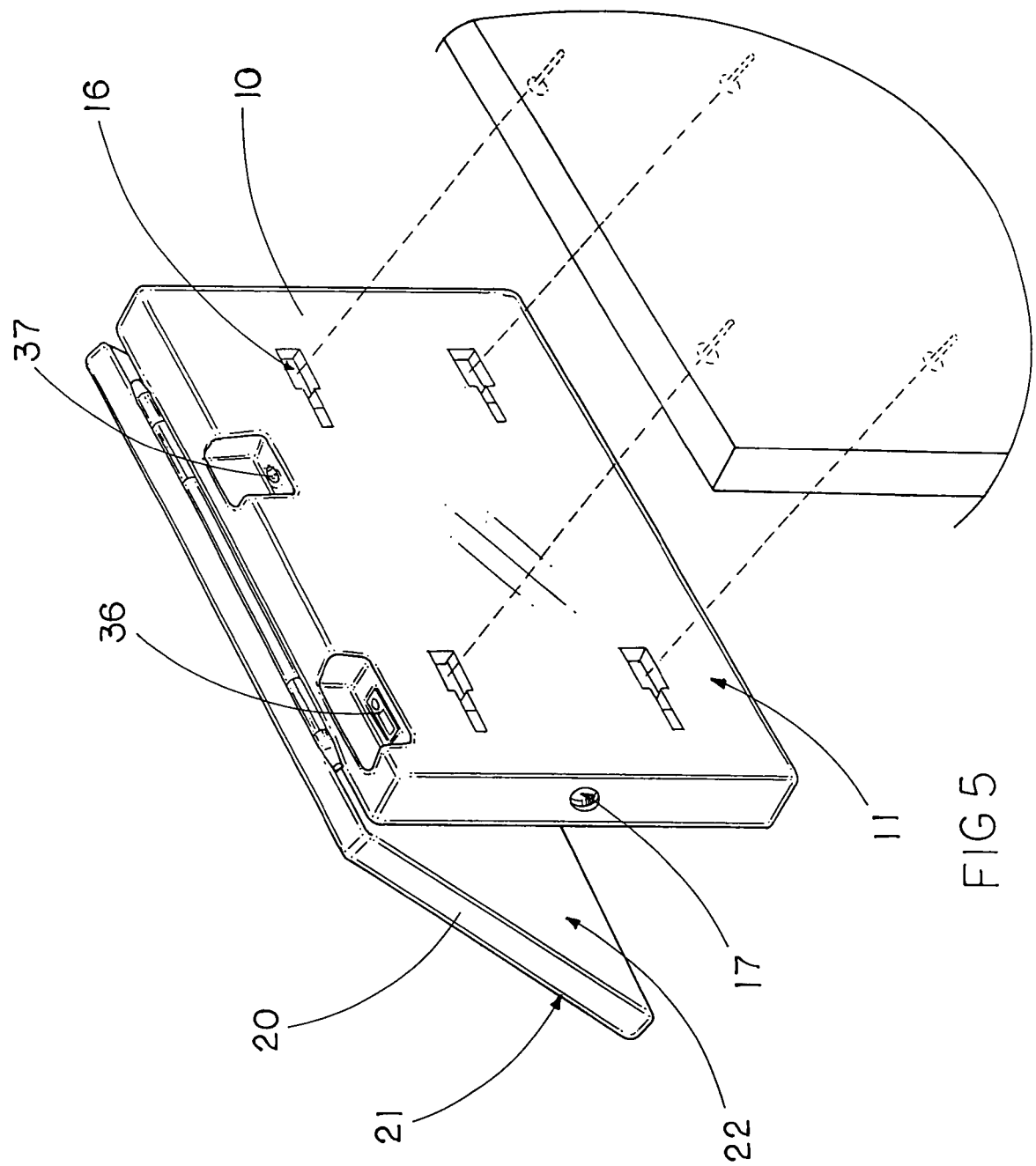
FIG. 5 is a rear perspective view of the foldable mobile video device according to the above preferred embodiment of the present invention.

Referring to FIG. 5 of the drawings, in order to enhance compatibility of the present invention to different environments, the multimedia unit 30 further comprises an audio jack 36 and a power outlet 37 provided at a peripheral edge of the base panel 10 for connecting with an audio headset and an external power source respectively. The audio jack 36 and the power outlet 37 are positioned to face towards the user when the display panel 20 is unfolded and in operation, as shown in FIG. 4 of the drawings. As a result, he/she is able to conveniently supply power to the video device through the well-positioned power outlet 37, and that while he/she is viewing certain multimedia materials, the user is able to easily access the audio jack 36 so as to connect with his/her headset by using minimum effort. This is extremely important when the user is viewing the multimedia materials in a confined and quite environment, such as traveling at night on a plane when everyone sitting near the user is sleeping.

As an alternative for powering up the multimedia unit 30, the foldable mobile video device further comprises a rechargeable battery 39 received in the base panel 10 to electrically connect with the multimedia unit 30, wherein the rechargeable battery 39 is adapted to be charged up for storing an electric power as a power source to supply electricity for the multimedia unit 30 so as to enhance a portability of the foldable mobile video device. It is worth mentioning that the rechargeable battery 39 and the power outlet 37 can be present electrically connected together such that the user is able to select which power supply he/she wishes to use for a particular circumstance. Thus, the power outlet 37 is adapted for not only electrically connecting with an external power source to supply electricity for the multimedia unit 30, but also charging up the rechargeable battery 39 at the same time, such that the base panel 10 is allowed for substantially laying on a surface when the power outlet 37 is electrically connected with the external power source to operate the multimedia unit 30.

As mentioned earlier, the display panel 20 is capable of pivotally moving between a folded position and an unfolded position. Accordingly, referring to FIG. 2 and FIG. 5 of the drawings, the foldable mobile video device further comprises means for detachably locking the inner enclosing side 22 of the display panel 20 with the front utility side 12 of the base panel 10 when the display panel 20 is pivotally folded to overlap the enclosing side 22 thereof on the utility side 12 of the base panel 10.

Accordingly, the locking means consists an elongated locking slot 23 indently formed on the inner enclosing side 22 of the display panel 20, and comprises a locking arm 14 upwardly extended from and slidably connected to the front utility side 11 at a position corresponding to the elongated locking slot 23 such that a top engaging portion 141 of the locking arm 14 is adapted to receive in the locking slot 23 and sidewardly slide to engage with a sidewall of the locking slot 23 so as to interlock a lateral pivotal movement of the base panel 10 and the display panel 20 for retaining the display panel 20 in the folded position.

Moreover, the locking means further comprises a resilient element mounted there in the base panel 10 to normally apply a sideward pushing force to the locking arm 14 so as to normally push the locking arm 14 engaging with the locking slot 23 for retaining the display panel 20 in the folded position, as shown in FIG. 2 of the drawings.

It is worth mentioning that the video device of the present invention is adapted to either stand on a flat surface, such as a table surface, as in FIG. 3 of the drawings, or be permanently or detachably mounted on a wall or other fixtures so as to fit to a wide variety of surrounding circumstances. Thus, referring to FIG. 5 of the drawings, the base panel 10 further has four mounting slots 16 indently and spacedly formed on the rear supporting side 11 for mounting or coupling with a hanger of an external fixture, preferably a mounting housing 40, which is then to be mounted on a car ceiling.

Figure 6:
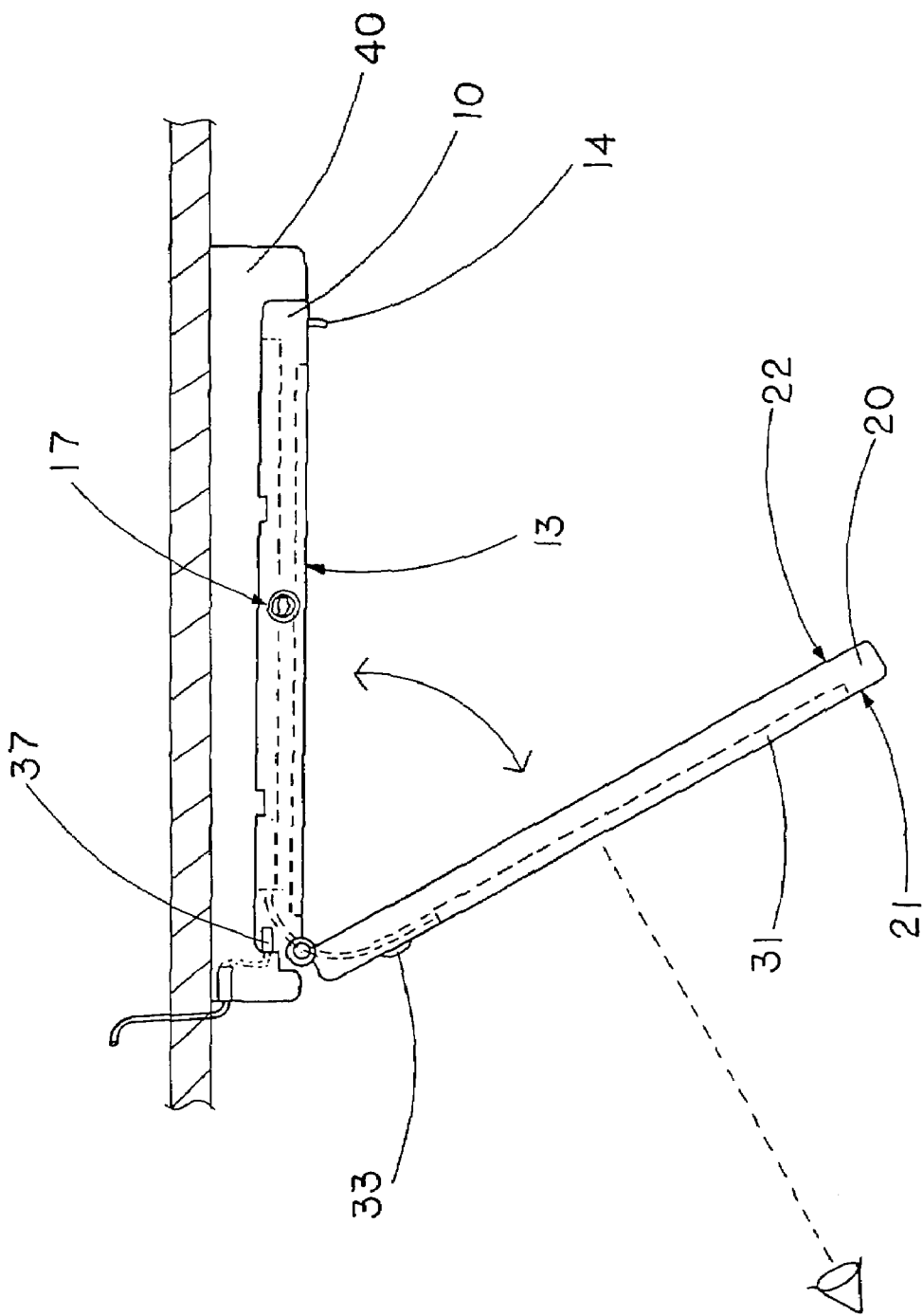
FIG. 6 is a schematic diagram of the foldable mobile video device according to the above preferred embodiment of the present invention, illustrating that the video device is supported on a ceiling.

FIG. 6 illustrates a first example application that the video device, which is at the unfolded position, is hangingly and suspendedly supported underneath a car ceiling through a mounting housing 40. The mounting housing 40 has a top affixing surface affixed on the car ceiling, and a receiving cavity formed on a bottom surface of the mounting housing 40. Moreover, the mounting housing 40 has four connecting members formed at a top wall of the receiving cavity wherein the mounting slots 16 are arranged to detachably engage with four connecting members respectively so as to securely receive and support the base panel 10 in an upright manner in the receiving cavity for hangingly suspending the video device at the unfolded position.

It is important to note that if the video device is mounted on a car ceiling through a mounting housing 40, the orientation of the display screen 31 is uprightly reversed as compared with the case when the video device is standing on a table surface. Thus, the multimedia unit 30 further comprises an image transformer which is embodied as an image reverse circuitry 38 (shown in FIG. 9) provided in the base panel 10 and electrically incorporated into the media reader 32 so as to selectively switch between a normal display mode for delivering normally oriented image on the display screen 31, and a reverse display mode for reversing the image displayed on the display screen 31 for matching with an mounting orientation of the video device of the present invention. In other words, the user is able to freely select the normal display mode and the reverse display mode so as to suit a particular mounting arrangement and therefore maximize an applicability of the video device in differing circumstances.

Figure 7:
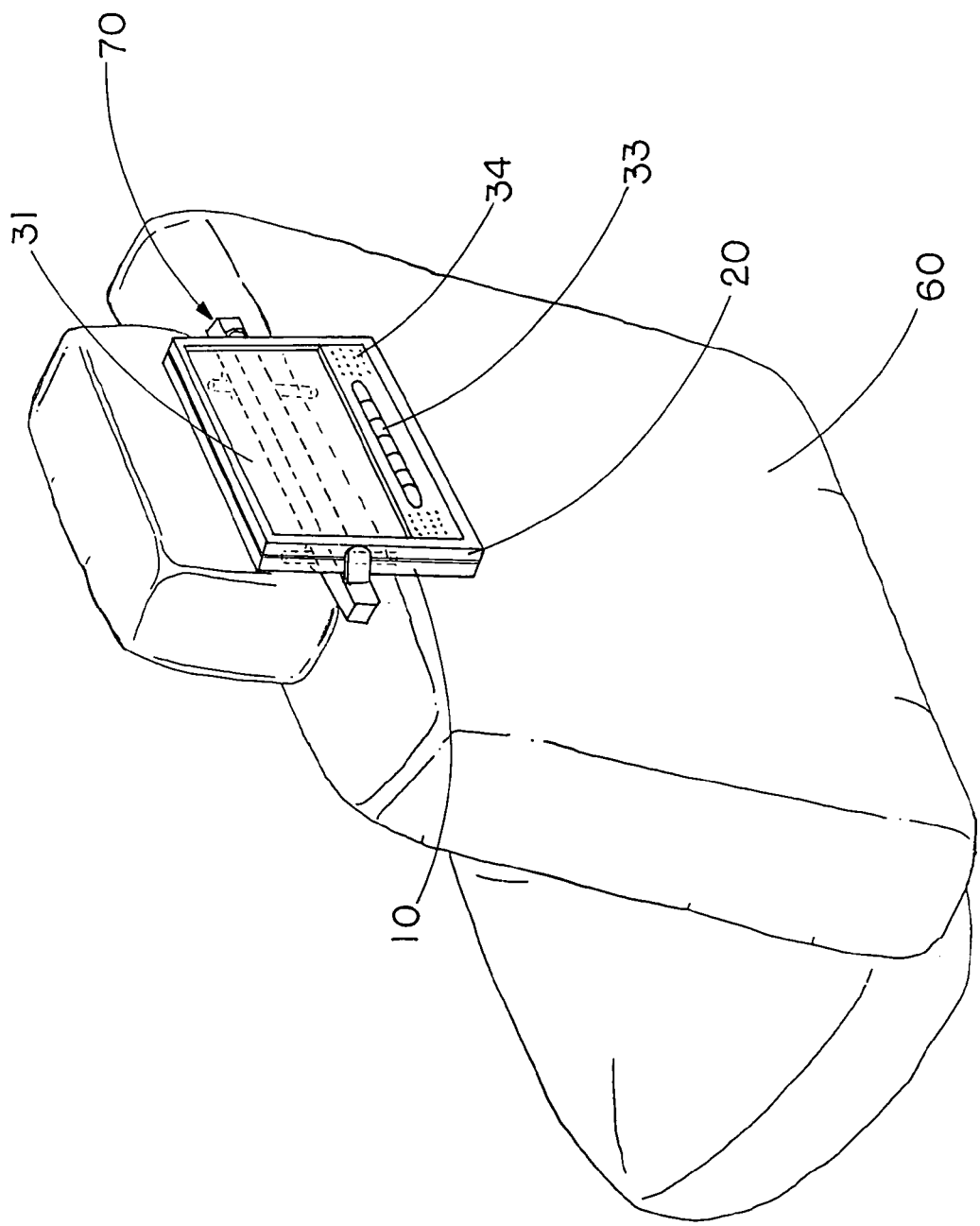
FIG. 7 is a schematic diagram of the foldable mobile video device according to the above preferred embodiment of the present invention, illustrating that the video device is mounted behind a car seat at a neck supporting portion thereof.

FIG. 7 illustrates a second example application that the video device is mounted on a car seat 60 at the neck supporting portion thereof through a mounting apparatus 70. According to the preferred embodiment, the base panel 10 further has two side engaging holes 17 formed at two sides of the base panel 10 for rotatably mounting with the mounting device 50 when the video device is at the folded position.

Figure 8:
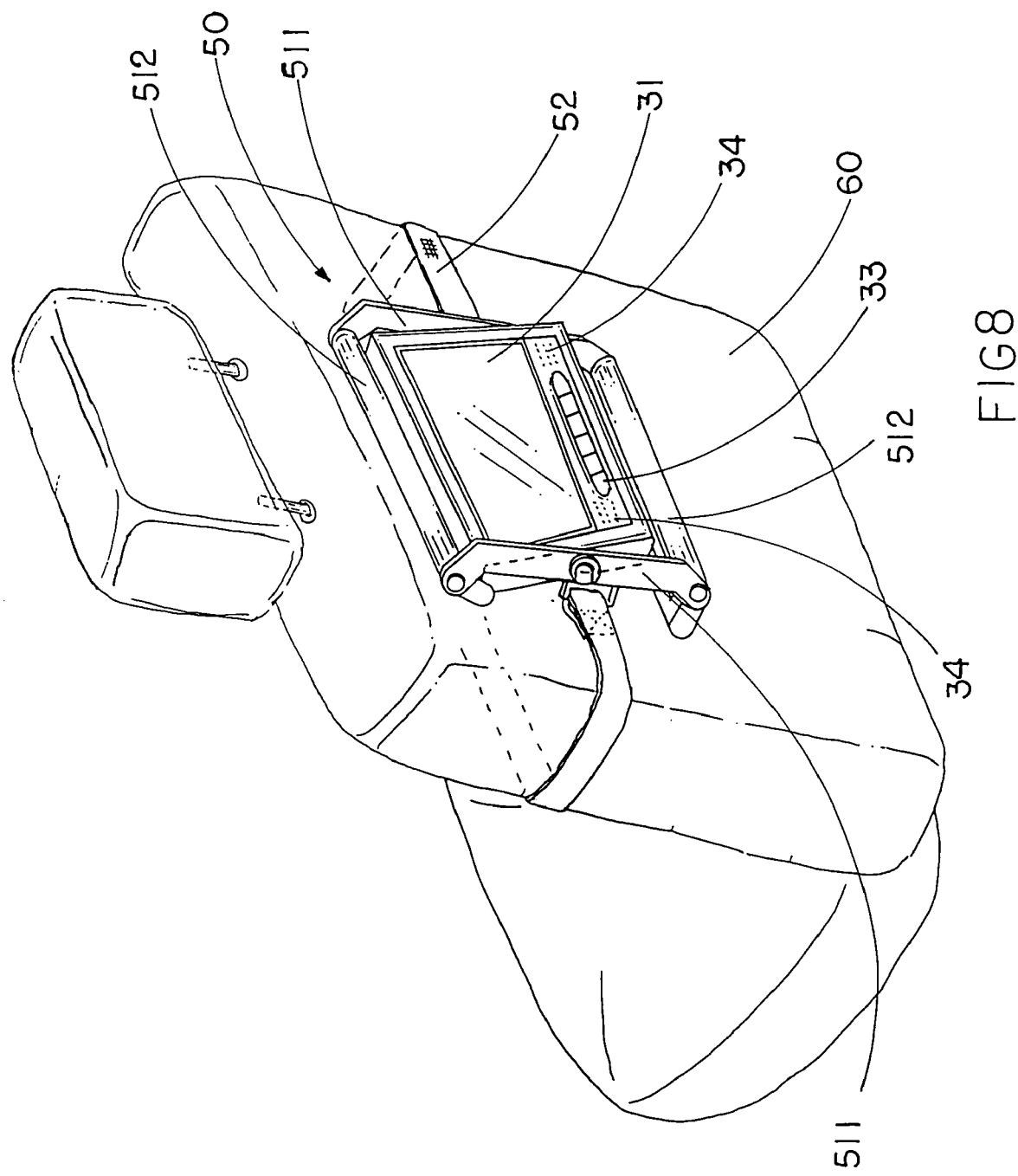
FIG. 8 is a schematic diagram of the foldable mobile video device according to the above preferred embodiment of the present invention, illustrating that the video device is mounted behind a car seat at a body supporting portion thereof.

FIG. 8 illustrates a third example application that the video device is mounted on a car seat 60 at the body supporting portion thereof through a mounting device 50. Specifically, the mounting device 50 comprises a mounting frame 51 comprising a pair of longitudinally extended and opposed supporting members 511 and a pair of transversely extended and opposed reinforcing members 512 extending between the supporting members 511 to define a multimedia boundary within the supporting members 511 and the reinforcing members 512. As shown in FIG. 8 of the drawings, the video device is rotatably and adjustably mounted within the multimedia boundary at the two supporting members 511 through the respective side engaging holes 17 of the base panel 10. Thus, the video device is capable of rotatably and adjustably moving within the multimedia boundary so as to adjust an optimal eye-to-screen distance between the display screen 31 and the eye of the user of the present invention. Moreover, the user is able to control an operation of the multimedia unit 30 manually through the control panel 33 or remotely through the remote control unit 35.

According to this third example application, the mounting device 50 further comprises a mounting strap 52 having two ends connected with the two supporting members 511 respectively to define a securing loop for mounting to the body supporting portion of the car seat 60, wherein, as in the second application example, the video device is capable of being rotatably adjusted within the multimedia boundary to have the optimal eye-to-screen distance.

From the foregoing descriptions, it can be shown that the above-mentioned objects can be substantially accomplished. The foldable mobile video device provides a compact, convenient and flexible multimedia player for use in outdoors environments, such as in a car.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable mobile video device, comprising:
   a base panel having a rear supporting side, a front utility side, and a multimedia compartment provided in said front utility side;
   a display panel having an outer displaying side and inner enclosing side, wherein said display panel is pivotally connected to said base panel edge-to-edge to pivotally fold said display panel between a folded position and an unfolded position, wherein at said folded position, said display panel is pivotally folded to overlap said enclosing side thereof on said front utility side of said base panel, and at said unfolded position, said display panel is pivotally folded to selectively adjust an angle between said base panel and said display panel; and
   a multimedia unit comprising:
   a display screen provided on said outer displaying side of said display panel, and a media reader operatively mounted at said multimedia compartment for reading digital data of a multimedia disposed in said multimedia compartment so as to display said digital data of said multimedia on said display screen, wherein said display screen is viewable while said display screen is positioned in both said folded position and said unfolded position;
   a control panel provided on said outer displaying side of said display panel to operatively control said media reader when said display screen is in said folded position and said unfolded position such that said display screen is adapted for contollably displaying said digital data of said multimedia when said display panel is pivotally folded to overlap said enclosing side thereof on said front utility side of said base panel; and
   an audio unit provided on said outer displaying side to operatively communicate with said media reader for transmitting a sound signal of said digital data of said multimedia; and
   an image transformer comprising an image reverse circuitry provided in said base panel and electrically incorporated with said media reader so as to selectively switch between a normal display mode for delivering normally oriented image on said display screen, and a reverse display mode for reversing said image displayed on said display screen for matching with an mounting orientation of said display screen, wherein said base panel further has a plurality of mounting slots spacedly formed on said rear supporting side for a hanger of an external fixture coupling thereto so as to suspendedly and detachably hang said base panel on said external fixture so as to allow said display screen to display multimedia materials in an optimal manner on said external fixture.

2. The foldable mobile video device, as recited in claim 1, wherein a length of said base panel is at least equal to a length of said display panel so as to minimize said distance occupation of said display panel within said length of said base panel when said display panel is pivotally and upwardly folded at said angle.

3. The foldable mobile video device, as recited in claim 1, further comprising a rechargeable battery received in said base panel to electrically connect with said multimedia unit, wherein said rechargeable battery is adapted to be charged up for storing an electric power as a power source to supply electricity for said multimedia unit so as to enhance a portability of said foldable mobile video device.

4. The foldable mobile video device, as recited in claim 2, further comprising a rechargeable battery received in said base panel to electrically connect with said multimedia unit, wherein said rechargeable battery is adapted to be charged up for storing an electric power as a power source to supply electricity for said multimedia unit so as to enhance a portability of said foldable mobile video device.

5. The foldable mobile video device, as recited in claim 2, further comprising a power outlet provided at a peripheral edge of said base panel to electrically connect with rechargeable battery, wherein said power outlet is adapted for not only electrically connecting with an external power source to supply electricity for said multimedia unit but also charging said rechargeable battery at the same time, such that said base panel is allowed for substantially laying on a surface when said power outlet is electrically connected with said external power source to operate said multimedia unit.

6. The foldable mobile video device, as recited in claim 3, further comprising a power outlet provided at a peripheral edge of said base panel to electrically connect with rechargeable battery, wherein said power outlet is adapted for not only electrically connecting with an external power source to supply electricity for said multimedia unit but also charging said rechargeable battery at the same time, such that said base panel is allowed for substantially laying on a surface when said power outlet is electrically connected with said external power source to operate said multimedia unit.

7. The foldable mobile video device, as recited in claim 4, further comprising a power outlet provided at a peripheral edge of said base panel to electrically connect with said rechargeable battery, wherein said power outlet is adapted for not only electrically connecting with an external power source to supply electricity for said multimedia unit but also charging said rechargeable battery at the same time, such that said base panel is allowed for substantially laying on a surface when said power outlet is electrically connected with said external power source to operate said multimedia unit.

8. The foldable mobile video device, as recited in claim 5, wherein said multimedia unit further comprises a remote control unit comprising a remote sensor provided at said outer displaying side to operatively communicate with said media reader, and a remote control wirelessly communicating with said remote sensor to remotely control said media reader to operate.

9. The foldable mobile video device, as recited in claim 6, wherein said multimedia unit further comprises a remote control unit comprising a remote sensor provided at said outer displaying side to operatively communicate with said media reader, and a remote control wirelessly communicating with said remote sensor to remotely control said media reader to operate.

10. The foldable mobile video device, as recited in claim 7, wherein said multimedia unit further comprises a remote control unit comprising a remote sensor provided at said outer displaying side to operatively communicate with said media reader, and a remote control wirelessly communicating with said remote sensor to remotely control said media reader to operate.

11. The foldable mobile video device, as recited in claim 1, further comprising a mounting device which comprises a mounting frame comprising a pair of longitudinally extended and opposed supporting members and a pair of transversely extended and opposed reinforcing members extending between said supporting members to define a multimedia boundary within said supporting members and said reinforcing members, wherein said base panel is selectively, rotatably and adjustably mounted within said multimedia boundary so as to adjust an optimal eye-to-screen distance between said display screen and an eye of a user.

12. The foldable mobile video device, as recited in claim 9, further comprising a mounting device which comprises a mounting frame comprising a pair of longitudinally extended and opposed supporting members and a pair of transversely extended and opposed reinforcing members extending between said supporting members to define a multimedia boundary within said supporting members and said reinforcing members, wherein said base panel is selectively, rotatably and adjustably mounted within said multimedia boundary so as to adjust an optimal eye-to-screen distance between said display screen and an eye of a user 13. The foldable mobile video device, as recited in claim 10, further comprising a mounting device which comprises a mounting frame comprising a pair of longitudinally extended and opposed supporting members and a pair of transversely extended and opposed reinforcing members extending between said supporting members to define a multimedia boundary within said supporting members and said reinforcing members, wherein said base panel is selectively, rotatably and adjustably mounted within said multimedia boundary so as to adjust an optimal eye-to-screen distance between said display screen and an eye of a user.

14. The foldable mobile video device, as recited in claim 9, further comprising means for detachably locking said inner enclosing side of said display panel with said front utility side of said base panel when said display panel is pivotally folded to overlap said enclosing side thereof on said front utility side of said base panel.

15. The foldable mobile video device, as recited in claim 10, further comprising means for detachably locking said inner enclosing side of said display panel with said front utility side of said base panel when said display panel is pivotally folded to overlap said enclosing side thereof on said front utility side of said base panel.

16. The foldable mobile video device, as recited in claim 13, further comprising means for detachably locking said inner enclosing side of said display panel with said front utility side of said base panel when said display panel is pivotally folded to overlap said enclosing side thereof on said front utility side of said base panel.

* * * * *